(12) United States Patent
Conrad

(10) Patent No.: US 6,274,053 B1
(45) Date of Patent: Aug. 14, 2001

(54) OZONATION PROCESS

(75) Inventor: Wayne Ernest Conrad, Hampton (CA)

(73) Assignee: Fantom Technologies Inc., Welland (CA)

( * ) Notice: Subject to any disclaimer, the term of this patent is extended or adjusted under 35 U.S.C. 154(b) by 0 days.

(21) Appl. No.: 09/594,715

(22) Filed: Jun. 16, 2000

(51) Int. Cl.⁷ .................................................... C02F 1/78
(52) U.S. Cl. ........................................................ 210/760
(58) Field of Search .......................................... 210/760

(56) References Cited

U.S. PATENT DOCUMENTS

| | | | |
|---|---|---|---|
| 5,498,347 | * | 3/1996 | Richard . |
| 5,888,403 | * | 3/1999 | Hayashi . |
| 6,068,778 | * | 5/2000 | Steiner et al. . |
| 6,074,564 | * | 6/2000 | Foellmi . |

* cited by examiner

Primary Examiner—David A. Simmons
Assistant Examiner—Betsey Morrison Hoey
(74) Attorney, Agent, or Firm—Philip C. Mendes de Costa; Bereskin & Parr

(57) ABSTRACT

A liquid such as water is sequentially treated with an ozone containing gas in at least two steps. During the first step, the liquid is treated with a first ozone containing gas which contains ozone at a first concentration. During the second step, the liquid is treated with a second ozone containing gas which contains ozone at a second concentration that is higher than the first concentration.

15 Claims, 1 Drawing Sheet

OZONATION PROCESS

FIELD OF THE INVENTION

This invention relates to a method and apparatus for treating a liquid such as water with a gas containing ozone. The apparatus may be used in the production of water suitable for human consumption from water contaminated by one or more of microorganisms, chemicals, heavy metals and minerals.

BACKGROUND OF THE INVENTION

Generally, drinking water is produced by municipalities from a lake or ground water by treating the water with ozone or chlorine. Once the water is treated, it is transported to households by pipes. Over time, contaminants may infiltrate into the pipeline. Accordingly, even though the potable drinking water is fed into the pipeline from a water treatment facility, the water may be contaminated by the time it enters a residence. Further, if there is a breakdown in equipment at the water treatment facility or a flood, contaminated water may enter the pipeline.

A variety of domestic filtration systems have been developed for use by consumers to filter water that is delivered by a tap. Such systems may use a filter made from a combination of a porous media filter and activated carbon through which water is passed. This type of system will reduce the levels of chlorine, lead, and pesticides. However, there are several disadvantages associated with this device. In particular, a filtration system will not remove microbiological contaminants from water.

Another popular system in use for the purification of contaminated water is a system which employs ultraviolet light for disinfection in series with a porous media and carbon filter. This type of system will reduce the levels of chlorine, lead, and pesticides and has some disinfection capability. One disadvantage with this system is that the ultraviolet light's disinfection efficacy is greatly diminished by turbidity or colour in the water which can cause the filter to become contaminated by microorganisms which can readily live and breed therein thereby multiplying the danger from any microorganisms which may be present. Thus, the filter of this system also suffers from the disadvantages associated with filters of filtration based systems.

Water treatment apparatus using oxidizing gases have been developed. Some of these devices operate on a batch basis. According to this process, the water is placed in a treatment container and the treatment agent (e.g. a gas), is disbursed through the water, such as via a sparger. Following the completion of the cycle, the water may then be used. One disadvantage with small scale ozone treatment systems such as for domestic applications is to produce an effective amount of ozone to kill a variety of different microbiological agents that may be present in the water.

BRIEF SUMMARY OF THE INVENTION

One method for producing ozone comprises passing a gas containing oxygen (eg. air) through a corona discharge field. The passage of the ozone through the field causes oxygen molecules to recombine to produce ozone. As the flow rate of gas through the corona discharge field increase, the amount of ozone which is produced per unit of time (eg. per minute) also increases. However, the rate of change of these two rates are not proportional. Therefore, as the flow rate of gas through the corona discharge field increases, the concentration of ozone in the gas leaving the corona discharge field decreases even though the total amount of ozone produced per unit time increases. Accordingly, a corona discharge ozone generator produces more grams of ozone per unit time at higher gas flow rates there through; however, the concentration of ozone produced by the ozone generator is lower. The higher flow rate provides more ozone per unit time and results in the rapid oxidation of many contaminants in water. However, it has been determined that the lower concentration of ozone produced by the higher flow rate is insufficient to oxidize some chemical compounds and to kill some micro-organisms.

Therefore, in accordance with the instant invention, a liquid such as water is treated under two successive steps with ozone. Pursuant to the first step, an oxygen containing gas is passed through a corona discharge generator at a relatively high flow rate to produce a gas containing ozone at a relatively low concentration and this gas is then used to treat the liquid. This step produces a greater mass of ozone per unit time than if a the gas were passed through the corona discharge generator at a lower flow rate. This results in the relatively rapid treatment of many contaminants due to the larger mass of ozone which is produced. Subsequently, an oxygen containing gas is passed through a corona discharge generator at a relatively low flow rate to produce a gas containing ozone at a relatively high concentration and this gas is then used to treat the liquid. While the liquid is treated with a lower amount ozone per unit time during the second step, the increased concentration is used to oxidize those contaminants that are not oxidized efficiently by the lower concentration of ozone that is produced in the first step.

One advantage of this method is that the total treatment time for the liquid is reduced without compromising the degree to which the liquid is treated.

In accordance with the instant invention, there is provided a method for treating a liquid with a gas containing ozone comprising the steps of passing air through an ozone generator at a first flow rate to produce air having a first concentration of ozone and introducing the air having the first concentration of ozone into the liquid; and, subsequently passing air through the ozone generator at a second flow rate to produce air having a second concentration of ozone which is higher than the first concentration of ozone and introducing the air having the second concentration of ozone into the liquid.

In one embodiment, the second flow rate is lower than the first flow rate. Preferably, the second flow rate is about 50 to 85% lower than the first flow rate. Preferably, the second concentration is at least 25% higher than the first concentration.

In another embodiment, the ozone generator is a corona discharge generator and the method further comprises providing a substantially constant current to the ozone generator.

In another embodiment, the method further comprises the step of introducing the liquid to be treated into a treatment vessel prior to introducing the gas into the liquid.

In another embodiment, the liquid is water and the method further comprises introducing the water to be treated into a treatment vessel prior to introducing the gas into the liquid whereby potable water is produced by contacting the water with the gas.

In accordance with the instant invention, there is provided a method for treating a liquid with a gas containing ozone comprising the steps of treating the liquid with a first ozone containing gas which contains ozone at a first concentration; and, subsequently treating the liquid with a second ozone containing gas which contains ozone at a second concentration which is higher than the first concentration.

In one embodiment, the first ozone containing gas is introduced at a first flow rate to the liquid and the second ozone containing gas is introduced at a second flow rate to the liquid and the second flow rate is lower than the first flow rate.

In another embodiment, the ozone is produced by passing a gas containing oxygen through a corona discharge generator and the second ozone containing gas is produced by passing gas through the ozone generator at a lower flow rate than is used to produce the first ozone containing gas.

In another embodiment, the method further comprises providing a substantially constant current to the ozone generator.

BRIEF DESCRIPTION OF THE DRAWINGS

A further, detailed description of the invention, briefly described above, will follow by reference to the following drawings of a preferred embodiment of the invention in which.

DETAILED DESCRIPTION OF THE PREFERRED EMBODIMENT

The method and apparatus of the instant invention may be used to treat any liquid with ozone. The following description is based on the use of the method and apparatus to treat water to obtain potable water. It is to be appreciated that the water to be treated may already have been treated such as by a municipal water treatment facility to provide drinking water to a community. However, as in some cases the water delivered to a residence may become contaminated, or may not be sufficiently treated by the municipal water treatment facility, a water treatment apparatus which utilizes this method may be used by an individual to treat the water which is delivered to their residence. The water treatment apparatus may also used to treat well water, lake water as well as other source of water which may be used by people to obtain potable water. The water treatment apparatus may be sized to treat small batches of drinking water (eg. 1–2 litres), or to treat all the water delivered to a sink in a house (eg. a point of use water treatment unit) or all of the water which is delivered to a house prior to the water entering the piping system in the house (a point of entry water treatment unit).

Figure 1:
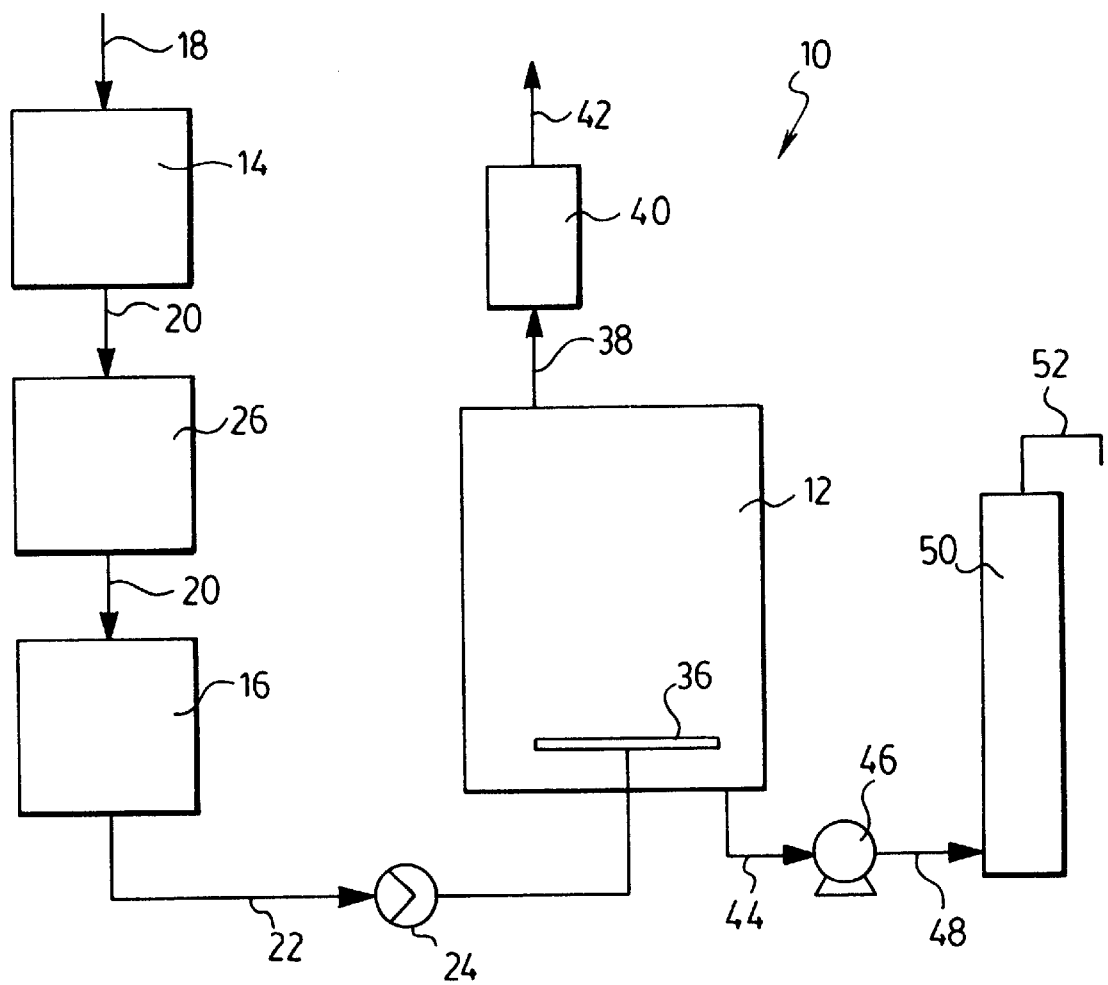
FIG. 1 shows a schematic representation of the apparatus according to the instant invention; and, FIG. 2 shows a schematic representation of an ozone generator which may be used with the apparatus of FIG. 1.

As shown in FIG. 1, water treatment apparatus 10 comprises a water treatment vessel 12, an air pump 14 and an ozone generator 16. Air stream 18 is drawn into air pump 16 and fed via conduit 20 to ozone generator 16 which produces air containing ozone. The air containing ozone is fed via conduit 22 to water treatment vessel 12. A check valve 24 may be optionally provided to prevent water flowing backwardly through conduit 22 to ozone generator 16.

Optionally, an oxygen concentrator 26 may be provided in conduit 20 to increase the concentration of oxygen in the air fed to ozone generator 16 which will increase the concentration of ozone produced by ozone generator 16.

Figure 2:
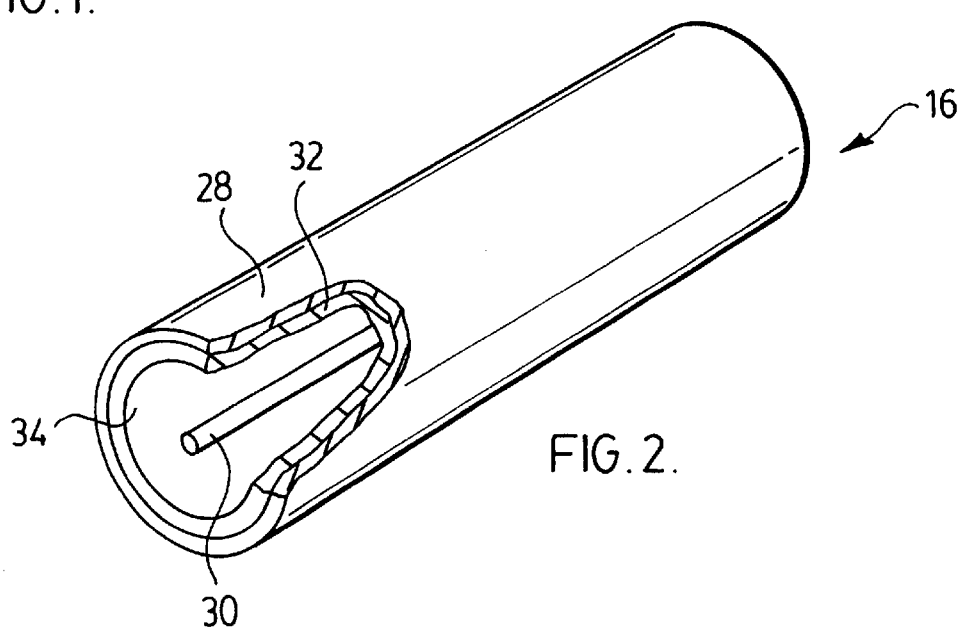

Ozone generator 16 is preferably of the corona discharge type. In such generators, a high voltage electrode is spaced from a ground electrode with a dielectric member positioned there between. An air flow path is provided between the electrodes (eg. between the high voltage electrode and the dielectric member and/or between the dielectric member and the ground electrode). Ozone generator 16 may be of any particular configuration. For example, it may be a flat plate generator (i.e the electrodes may be flat) or it may be of the tubular type as shown in FIG. 2. As shown in FIG. 2, ozone generator 16 comprises a cylindrical outer ground electrode 28 and an inner high voltage electrode 30. Dielectric member 32 is positioned adjacent ground electrode 28 and spaced from high voltage electrode 30 to define an annular air flow path. Ozone generator may be electrically connected to any current source as is known in the art and may be connected in air flow communication with conduits 20 and 22 by any means known in the art.

In accordance with the instant invention, ozone at two different concentrations is provided to water treatment vessel 12. This is preferably achieved by using an air pump capable of operating at two different speeds. Thus, air pump 14 may provide first and second flow rates of air to conduit 20. In a counter top domestic application designed to treat two litres of water at a time, the first or higher flow rate may be 4–6 litres/minute and the second or lower air flow rate may be 1–2 litres/minute. Preferably, the higher flow rate is reduced by 50–85% to obtain the lower flow rate. This results is an increase of 25% or more in the concentration of ozone in the air exiting ozone generator 16 while reducing the total amount of ozone produce per unit time by about 50%. The higher flow rate may be provided to water treatment vessel for 25–75% of the ozone treatment cycle.

When the flow rate of air which passes through annular air flow path 34 of ozone generator 26 increases, the total amount of ozone that is produced each minute is increased. However, the rate of production of ozone does not increase at the same rate that the air flow increases. Thus, if the air flow rate is increased by 50%, then typically, the concentration of ozone in the air exiting ozone generator 16 will be reduced by about 20—35%. Conversely, as the air flow rate through ozone generator 16 is reduced, the concentration of ozone in the air exiting ozone generator 16 increases. The actual air flow rates which are used may be selected based on the level of treatment (or kill when expressed in terms of micro-biological contaminants) which is desired, the time to obtain the desired level of treatment, the amount of ozone which the ozone generator will produce and the volume of water to be treated. It will be appreciated that, instead of using a two speed air pump 14, two air pumps each of which operate at a different speed may be utilized.

In one embodiment, the current which is provided to ozone generator 16 will be constant during both operational modes of air pump 14. However, as the higher air flow rate will provide additional cooling to high voltage electrode 30, a higher current may be applied during the high flow rate mode of operation. Thus the voltage applied to ozone generator 16 may be optimized for the high flow rate mode of operation and the low flow rate mode of operation.

It will also be appreciated that instead of using a two speed air pump, two air pumps may be used and each air pump may deliver air to different ozone generators. Thus water treatment vessel 12 may initially receive ozone containing air from a first air pump and ozone generator and then subsequently receive ozone containing air from a second air pump and ozone generator. A valve (eg. a solenoid valve or check valve) may be used to selectively connect water treatment vessel 12 in air flow communication with the air pump that is operational.

As shown in FIG. 1, water treatment vessel 12 is a batch treatment reactor. Thus, water is introduced into water treatment vessel 12 and is then treated with at least two different concentrations of ozone containing gas. In the first of these, air is pumped through ozone generator 16 to produce air having a relatively a low concentration of ozone (the first concentration) which is fed to water treatment vessel 12 via conduit 22. The air containing the low concentration of ozone provides a greater amount of ozone per unit time to water treatment vessel 12 and will oxidize the major mass of pollutants. Subsequently, the air flow rate through ozone generator 16 is reduced such that a relatively low flow rate of relatively higher concentration ozone (the second concentration) is proved for treating water in water treatment vessel 12. Although the total amount of ozone provided to water treatment vessel 12 is reduced during the second step, the second concentration is higher than the first concentration and is efficacious to treat certain chemical and micro-biological contaminants in the water.

Water treatment vessel 12 may be of any particular design known in the art and water and the air containing ozone may be introduced into water treatment vessel 12 by any method known in the art. For example, water treatment vessel 12 may have an inlet port for the water to be treated and a separate inlet port in fluid communication with sparger 36 for the air containing ozone. Sparger 36 may be any means known in the art to introduce the ozone containing air to the water in water treatment vessel 12 as bubbles. Alternately, the water and the air containing ozone may be introduced through the same inlet port. While some of the air containing ozone may be introduced into water treatment vessel 12 when at least some of the liquid is in water treatment vessel 12, it is preferred that all of the air containing ozone is introduced into water treatment vessel 12 once a full charge of water to be treated has been introduced into water treatment vessel 12.

It will be appreciated that water treatment vessel 12 may be a continuous feed reactor having a first inlet for introducing air having a first concentration of ozone and a second inlet downstream from the first inlet for introducing air having a second concentration of ozone.

It will also be appreciated that the water to be treated may be filtered (eg. by passing the water through a carbon filter) prior to treating the water with ozone.

The off gas may be permitted to exit water treatment vessel 12 via conduit 38 during the treatment cycle. The off gas generally contains some ozone and is therefore preferably fed to ozone destructor 40 wherein the ozone is converted to oxygen such as by contacting the ozone with, eg., one or more of manganese dioxide, titanium dioxide, iron oxide, or carbon or any other material known in the art top convert ozone to oxygen. The treated off gas may then be released from apparatus 10 via conduit 42. Optionally, some or all of the off gas may be retained in water treatment vessel 12 during the treatment cycle to pressurize water treatment vessel 12. In such an embodiment, the off gas outlet port may be partially or fully sealed during part or all of the treatment cycle.

Water treatment apparatus 10 may be actuated by any other means known in the art. For example, the unit may be actuated when a lid for water treatment vessel 12 is sealed or, if the water is supplied via a hose, when a sensor (eg. a float switch) detects a full charge in water treatment vessel 12 or when a start button is pushed.

Once the water in water treatment vessel 12 is sufficiently treated, a lid for water treatment vessel 12 may be removed, and the water may be removed for use (eg. it may be poured out of water treatment vessel 12, preferably through a filter).

It will of course be appreciated that an outlet for the water may be in any suitable form. For example, referring to FIG. 1, the outlet may be connected to conduit 44 which is in fluid flow communication with water pump 46 which in turn is fluid flow communication with carbon block filter 50 via conduit 48. Filter 50 may be in fluid flow communication with dispenser 52.

Optionally a sensor (not shown) may be provided for monitoring the treatment of the water and providing a signal to a user when the treatment is complete. The sensor may send a signal indicating that the treatment was successfully completed or that the treatment was not successfully completed. The sensor may be any of those known in the art.

It will be appreciated by those skilled in the art that various modifications may be made within the spirit of the present invention, the scope of which is limited only by the claims. For example, water treatment vessel 12 may be in fluid flow communication with a sources of ozone such as canisters of compressed ozone gas of varying concentrations which are provided as part of the apparatus 10 or is connectable to water treatment vessel 12 via a hose.

I claim:

1. A method for treating a liquid with a gas containing ozone comprising the steps of:
    (a) passing air through an ozone generator at a first flow rate to produce air having a first concentration of ozone and introducing the air having the first concentration of ozone into the liquid; and,
    (b) subsequently passing air through the ozone generator at a second flow rate to produce air having a second concentration of ozone which is higher than the first concentration of ozone and introducing the air having the second concentration of ozone into the liquid.

2. The method as claimed in claim 1 wherein the second flow rate is lower than the first flow rate.

3. The method as claimed in claim 1 wherein the second flow rate is about 50 to 85% lower than the first flow rate.

4. The method as claimed in claim 3 wherein the second concentration is at least 25% higher than the first concentration.

5. The method as claimed in claim 1 wherein the ozone generator is a corona discharge generator and the method further comprises providing a substantially constant current to the ozone generator.

6. The method as claimed in claim 1 further comprising the step of introducing the liquid to be treated into a treatment vessel prior to introducing the gas into the liquid.

7. The method as claimed in claim 1 wherein the liquid is water and the method further comprises introducing the water to be treated into a treatment vessel prior to introducing the gas into the liquid whereby potable water is produced by contacting the water with the gas.

8. A method for treating a liquid with a gas containing ozone comprising the steps of:
    (a) treating the liquid with a first ozone containing gas which contains ozone at a first concentration; and,
    (b) subsequently treating the liquid with a second ozone containing gas which contains ozone at a second concentration which is higher than the first concentration.

9. The method as claimed in claim 8 wherein the first ozone containing gas is introduced at a first flow rate to the liquid and the second ozone containing gas is introduced at a second flow rate to the liquid and the second flow rate is lower than the first flow rate.

10. The method as claimed in claim 9 wherein the second flow rate is about 50 to 85% lower than the first flow rate.

11. The method as claimed in claim 8 wherein the second concentration is at least 25% higher than the first concentration.

12. The method as claimed in claim 8 wherein the ozone is produced by passing a gas containing oxygen through a corona discharge generator and the second ozone containing gas is produced by passing gas through the ozone generator at a lower flow rate than is used to produce the first ozone containing gas.

13. The method as claimed in claim 12 further comprising providing a substantially constant current to the ozone generator.

14. The method as claimed in claim 12 further comprising the step of introducing the liquid to be treated into a treatment vessel prior to introducing the gas into the liquid.

15. The method as claimed in claim 8 wherein the liquid is water and the method further comprises introducing the water to be treated into a treatment vessel prior to introducing the first and second ozone containing gas into the liquid whereby potable water is produced by contacting the water with the gas.

\* \* \* \* \*